(12) United States Patent
Fujii et al.

(10) Patent No.: US 7,057,882 B2
(45) Date of Patent: Jun. 6, 2006

(54) CHIP SOLID ELECTROLYTIC CAPACITOR

(75) Inventors: Tatsuo Fujii, Osaka (JP); Junichi Kurita, Osaka (JP); Yuji Midou, Osaka (JP); Tsuyoshi Yoshino, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/222,964

(22) Filed: Sep. 12, 2005

(65) Prior Publication Data

US 2006/0056136 A1  Mar. 16, 2006

(30) Foreign Application Priority Data

Sep. 13, 2004  (JP) .............................. 2004-265104

(51) Int. Cl.
*H01G 9/00* (2006.01)
*H01G 4/228* (2006.01)
*H01G 9/10* (2006.01)

(52) U.S. Cl. ....................... 361/540; 361/538; 361/528

(58) Field of Classification Search ................. 361/323, 361/528–529, 532–533, 535–540, 523
See application file for complete search history.

(56) References Cited

U.S. PATENT DOCUMENTS

| 6,400,556 B1 * | 6/2002 | Masuda et al. ............. 361/523 |
| 6,519,135 B1 * | 2/2003 | Sano et al. ................. 361/510 |
| 6,920,037 B1 * | 7/2005 | Sano et al. ................. 361/540 |
| 2003/0174460 A1 * | 9/2003 | Sano et al. ................. 361/523 |

FOREIGN PATENT DOCUMENTS

JP   2004-095816   3/2004

* cited by examiner

*Primary Examiner*—Eric W. Thomas
(74) *Attorney, Agent, or Firm*—Wenderoth, Lind & Ponack, L.L.P.

(57) ABSTRACT

A chip solid electrolytic capacitor includes a capacitor element with an anode portion and a cathode portion, an anode lead frame, a cathode lead frame and packaging resin. The anode lead frame includes a first plane, an anode junction and an anode terminal. The anode junction is formed on one end of the first plane and connected to the anode portion. The anode terminal is formed on the other side of the first plane. The cathode lead frame has a second plane and a cathode terminal. The second plane has the cathode portion mounted thereon, is connected to the cathode portion, and is stacked on the first plane. The cathode terminal is formed on the same side of the second plane as the anode terminal. The packaging resin has a surface to be mounted and covers the capacitor element, with the anode terminal and the cathode terminal exposed on the surface to be mounted.

20 Claims, 8 Drawing Sheets

CHIP SOLID ELECTROLYTIC CAPACITOR

BACKGROUND OF THE INVENTION

1. Field of the Invention

The present invention relates to a capacitor used in various types of electronic appliances, and more specifically, to a chip solid electrolytic capacitor having a solid electrolyte made of conductive polymer.

2. Background Art

Electronic appliances are being designed to operate at higher and higher frequencies; consequently, capacitors as an electronic component are being required to have excellent impedance characteristics in higher frequencies than before. In order to meet this demand, various types of solid electrolytic capacitors are being developed which have a solid electrolyte made of conductive polymer high in electric conductivity.

On the other hand, solid electrolytic capacitors used in the CPU periphery of personal computers are strongly expected to shrink in size and grow in capacity. Furthermore, as circuits are operated at higher and higher frequencies, capacitors are strongly required to have not only lower ESR (Equivalent Series Resistance) but also lower ESL (Equivalent Series Inductance) as well as excellent noise rejection and excellent transient response.

FIGS. 10A to 10C show the structure of a conventional chip solid electrolytic capacitor. FIG. 10A is a cross sectional view showing a laminated body of capacitor elements of the capacitor, FIG. 10B is a perspective view showing the internal structure of the capacitor and FIG. 10C is a perspective view showing the external appearance of the capacitor. Each of capacitor elements 13 includes anode electrode 14, solid electrolyte layer 15 and cathode electrode 16. Anode electrode 14 is formed by roughening the surface of valve metal foil and then forming a dielectric oxide film thereon. Anode electrode 14 is provided with an unillustrated insulating portion in a predetermined position so as to be divided into an anode portion and a cathode portion. On the dielectric oxide film in the cathode portion are formed solid electrolyte layer 15 made of conductive polymer and cathode electrode 16 which are laminated in this order. A laminated body of a plurality of capacitor elements 13 is referred to as capacitor elements laminated body (hereinafter, laminated body) 17.

Anode terminal 18 includes anode electrode connection 18A to be connected to anode electrodes 14 of laminated body 17. Cathode terminal 19 includes cathode electrode connection 19A to be connected to cathode electrodes 16 of laminated body 17. Packaging resin 21 covers laminated body 17, anode electrode connection 18A and cathode electrode connection 19A.

In the conventional chip solid electrolytic capacitor thus structured, anode terminal 18 and cathode terminal 19 are aligned in a same plane with a distance of 0.2 to 2.0 mm between them. This arrangement allows the current for charging the chip solid electrolytic capacitor to flow in a loop, passing through anode terminal 18, anode electrode connection 18A, laminated body 17, cathode electrode connection 19A and cathode terminal 19 in this order. The loop area is so small that the ESL can be reduced to about 580 pH, for example. Such a chip solid electrolytic capacitor is disclosed in Japanese Patent Unexamined Publication No. 2004-95816.

Thus, in the conventional chip solid electrolytic capacitor, the ESL is reduced by aligning anode terminal 18 and cathode terminal 19 flush with and close to each other. However, further reduction in ESL is required in order to meet the recent demand in the market.

SUMMARY OF THE INVENTION

An object of the present invention is to provide a chip solid electrolytic capacitor with lower ESL than before. The chip solid electrolytic capacitor of the present invention includes a capacitor element, an anode lead frame, a cathode lead frame and packaging resin. The capacitor element has an anode portion and a cathode portion. The anode lead frame includes a plane, an anode junction and an anode terminal for surface mounting. The anode junction is formed on one end of the plane so as to be connected to the anode portion of the capacitor element. The anode terminal is formed on the side opposite to the anode junction with respect to the plane. The cathode lead frame has a plane and a cathode terminal for surface mounting. The plane of the cathode lead frame mounts the cathode portion of the capacitor element thereon in such a manner as to be connected to the cathode portion, and is stacked on the plane of the anode lead frame, while being insulated from it. The cathode terminal is formed on the same side as the anode terminal with respect to the plane. The packaging resin has a surface to be mounted, and covers at least the capacitor element, with the anode terminal and the cathode terminal exposed on the surface to be mounted. In the chip solid electrolytic capacitor of the present invention, the cathode lead frame and the anode lead frame are stacked with each other so as to make currents flowing through them in opposite directions. This cancels out the electromagnetic effects of the currents flowing through these lead frames, thereby greatly reducing the ESL.

DETAILED DESCRIPTION OF THE INVENTION

Exemplary Embodiments of the present invention will be described as follows with reference to accompanying drawings. Note that the components which are substantially the same are labeled with the same reference marks in the embodiments, and the detailed description is not repeated.

FIRST EXEMPLARY EMBODIMENT

Figure 1A:
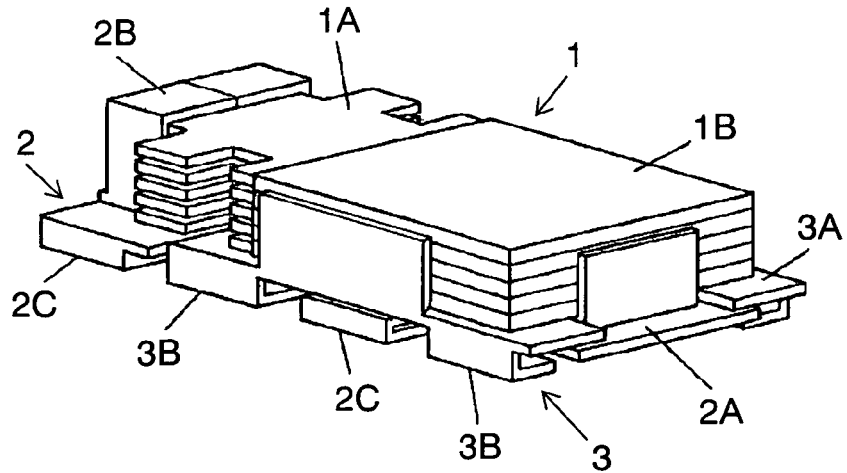
FIG. 1A is a perspective view of a chip solid electrolytic capacitor according to a first exemplary embodiment of the present invention.
Figure 1B:
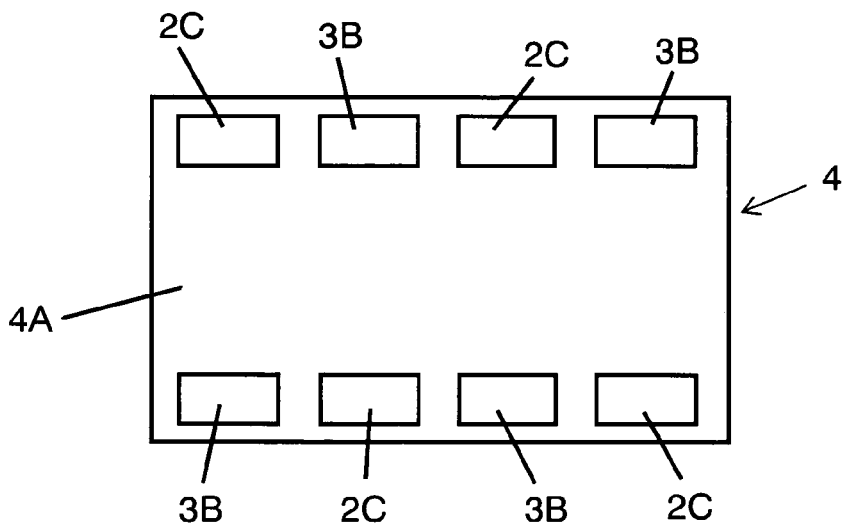
FIG. 1B is a bottom view of the chip solid electrolytic capacitor according to the first exemplary embodiment of the present invention.
Figure 1C:
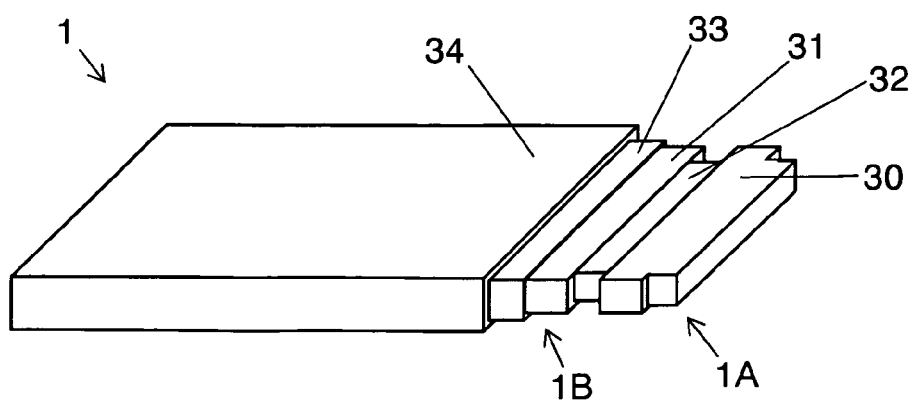
FIG. 1C is a partly broken perspective view of a capacitor element used in the chip solid electrolytic capacitor shown in FIG. 1A.

FIGS. 1A and 1B are a perspective view and a bottom view, respectively, of a chip solid electrolytic capacitor of a first exemplary embodiment of the present invention. In FIG. 1A, packaging resin 4 is not illustrated. FIG. 1C is a partly broken perspective view of a capacitor element used in the chip solid electrolytic capacitor shown in FIG. 1A.

Figure 2A:
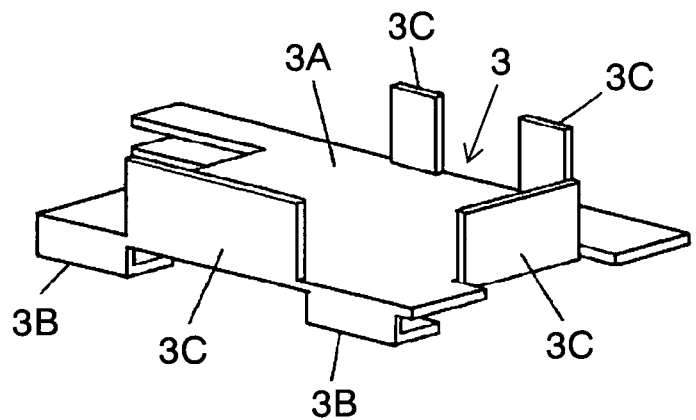
FIG. 2A is a perspective view of a cathode lead frame in the structure of FIG. 1A.
Figure 2B:
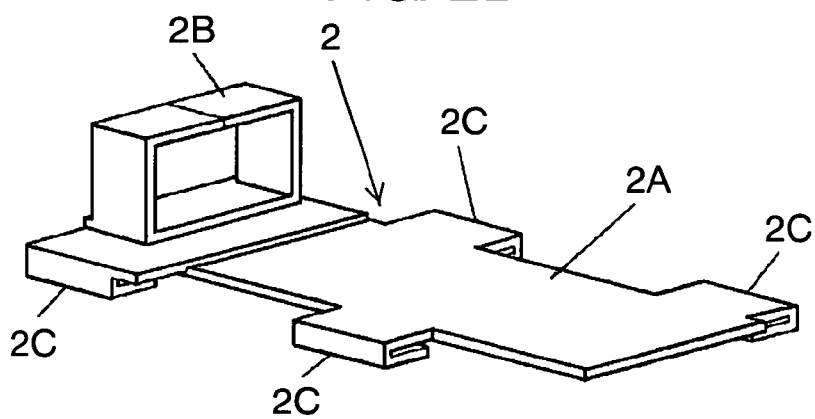
FIG. 2B is a perspective view of an anode lead frame in the structure of FIG. 1A.
Figure 2C:
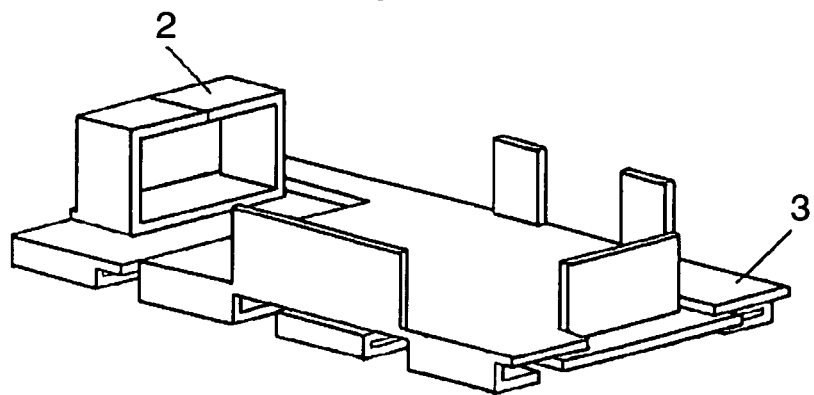
FIG. 2C is a perspective view of the lead frames shown in FIGS. 2A and 2B combined together.

FIGS. 2A and 2B are perspective views of a cathode lead frame and an anode lead frame, respectively, used in the chip solid electrolytic capacitor; and FIG. 2C is a perspective view of these lead frames combined together.

Each of capacitor elements 1 includes anode body 30, which is made of aluminum foil as a valve metal and is formed by roughening the surface of the aluminum foil and applying dielectric oxide film 31 on the surface. Anode body 30 is provided with insulating portion 32 in a predetermined position so as to be divided into anode portion 1A and cathode portion 1B. On dielectric oxide film 31 in cathode portion 1B are formed solid electrolyte layer 33 made of conductive polymer and cathode layer 34 made of carbon and silver paste. Solid electrolyte layer 33 and cathode layer 34 are laminated in this order.

Anode lead frame 2 has anode junction 2B to be connected to anode portions 1A of capacitor elements 1 on one end of plane 2A, which is a first plane. Anode lead frame 2 further has, on its bottom surface, anode terminals 2C for surface mounting. Anode terminals 2C are projected from plane 2A towards the side of bottom surface 4A of packaging resin 4 by bending the frame substrate. Bottom surface 4A is a surface to be mounted. Thus, anode junction 2B and anode terminals 2C are formed on opposite sides with respect to plane 2A.

Cathode lead frame 3 has plane 3A, which is a second plane, cathode terminals 3B for surface mounting, and guide walls 3C. Plane 3A mounts cathode portions 1B of capacitor elements 1 thereon in such a manner as to be connected to cathode portions 1B. Plane 3A is stacked on plane 2A of anode lead frame 2 via an unillustrated insulating layer disposed on plane 2A. In other words, plane 2A and plane 3A are insulated from each other. This insulating layer can be formed of polyimide film having a thickness of about 10 μm or by printing resin. Cathode terminals 3B are provided on the bottom surface of cathode lead frame 3. Cathode terminals 3B are projected from plane 3A towards the side of bottom surface 4A in such a manner as to have U-shaped side faces by bending the frame substrate. In other words, cathode terminals 3B are formed on the same side as anode terminals 2C with respect to plane 3A. Guide walls 3C stand on the top surface of plane 3A so as to position cathode portions 1B of capacitor elements 1. Guide walls 3C may be fixed to cathode portions 1B. Thus, cathode terminals 3B and guide walls 3C are formed on opposite sides relative to each other with respect to plane 3A.

Packaging resin 4, which is electrically insulating, covers capacitor elements 1, anode lead frame 2 and cathode lead frame 3 collectively in such a manner as to expose anode terminals 2C and cathode terminals 3B on bottom surface 4, which is the surface to be mounted. In other words, packaging resin 4 covers at least capacitor elements 1.

A method for manufacturing the chip solid electrolytic capacitor of the present embodiment will be described as follows. As a first step, cathode portions 1B of capacitor elements 1 are mounted on plane 3A of cathode lead frame 3, and then capacitor elements 1 and cathode lead frame 3 are connected to each other electrically and mechanically with a conductive adhesive. In this case, a single capacitor element may be used or a plurality of capacitor elements may be laminated as shown in FIG. 1A. One or more capacitor elements 1 are preferably positioned by guide walls 3C to stably form the entire shape of the chip solid electrolytic capacitor. This way of positioning is particularly preferable when two or more capacitor elements 1 are used. When capacitor elements 1 are positioned by other methods, guide walls 3C are dispensable. It is also possible to connect guide walls 3C to cathode portions 1B of capacitor elements 1 by using a conductive adhesive.

As a next step, plane 3A is stacked on plane 2A of anode lead frame 2 via an unillustrated insulating layer disposed between these planes. Then, anode portions 1A projected from cathode lead frame 3 are mounted on anode junction 2B formed on anode lead frame 2. Anode junction 2B is then bent to hold anode portions 1A and subjected to laser welding. As a result, anode lead frame 2 is connected to anode portions 1A of capacitor elements 1 electrically and mechanically.

As a final step, capacitor elements 1, anode lead frame 2 and cathode lead frame 3 are collectively covered with insulating packaging resin 4 in such a manner as to expose anode terminals 2C and cathode terminals 3B on bottom surface 4, which is the surface to be mounted. This is the completion of the chip solid electrolytic capacitor of the present embodiment.

In the chip solid electrolytic capacitor of the present embodiment thus structured, cathode lead frame 3 and anode lead frame 2 are stacked with each other. Furthermore, the direction in which current flows through cathode lead frame 3 and the direction in which current flows through anode lead frame 2 are opposite to each other. This structure cancels out the electromagnetic effects of the currents flowing through these lead frames, thereby greatly reducing the ESL. When a capacitor having the same capacity as the capacitor described above in the Background Art section is manufactured and measured for its ESL value, the obtained ESL value is as low as 271 pH, which indicates a reduction of about 53%.

In order to obtain great effects in ESL reduction with this structure, it is preferable that plane 2A and plane 3A have substantially the same shape and substantially the same area size. It is also preferable that the surfaces to be mounted of anode terminals 2C and those of cathode terminals 3B be in the same plane and close to each other. This can reduce the ESL.

At least one of anode terminals 2C and cathode terminals 3B are preferably provided in plural. The effects of this will be described in detail in a second exemplary embodiment.

SECOND EXEMPLARY EMBODIMENT

Figure 3A:
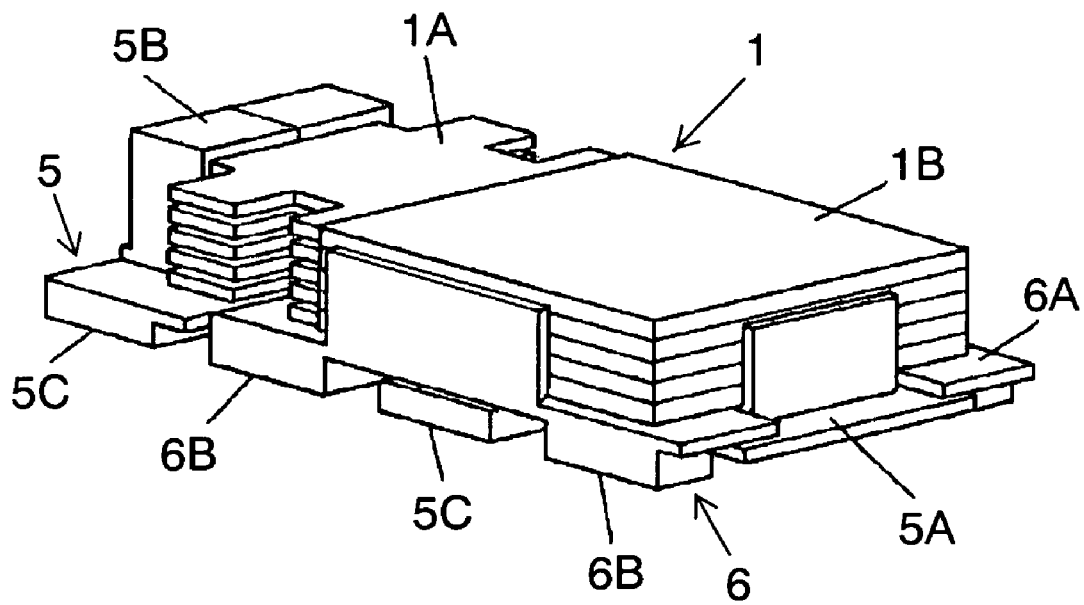
FIG. 3A is a perspective view of a chip solid electrolytic capacitor according to a second exemplary embodiment of the present invention.
Figure 3B:
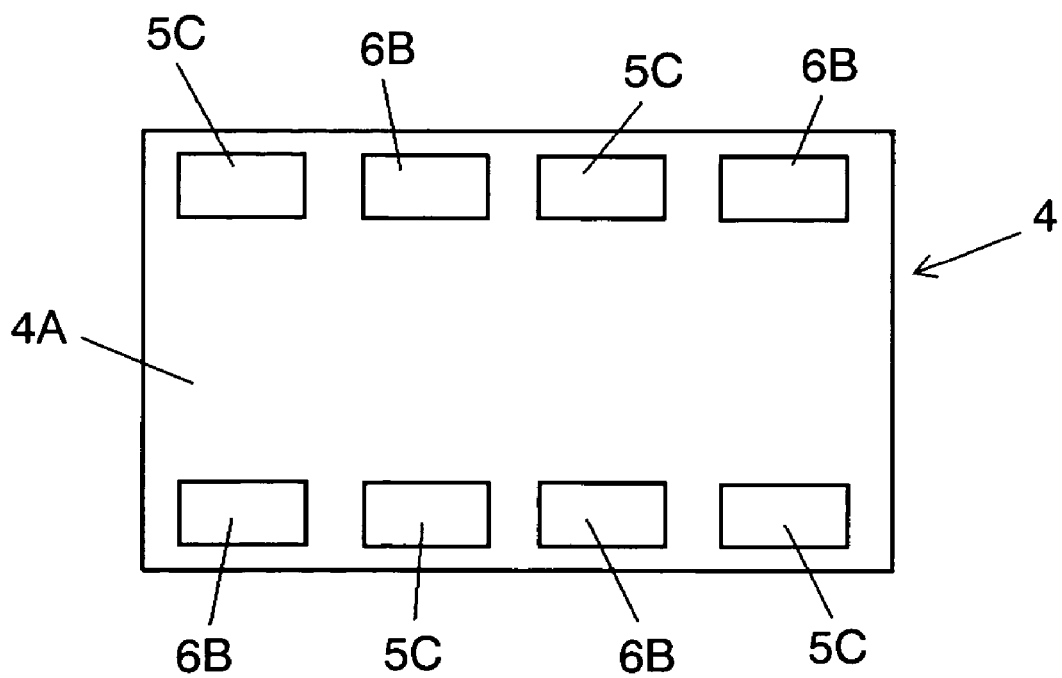
FIG. 3B is a bottom view of the chip solid electrolytic capacitor according to the second exemplary embodiment of the present invention.
Figure 4A:
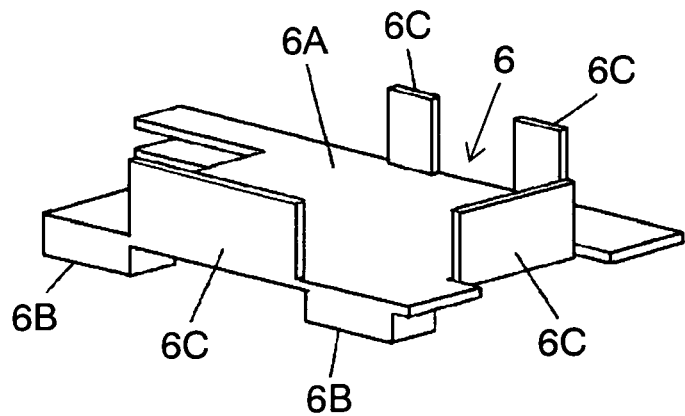
FIG. 4A is a perspective view of a cathode lead frame in the structure of FIG. 3A.
Figure 4B:
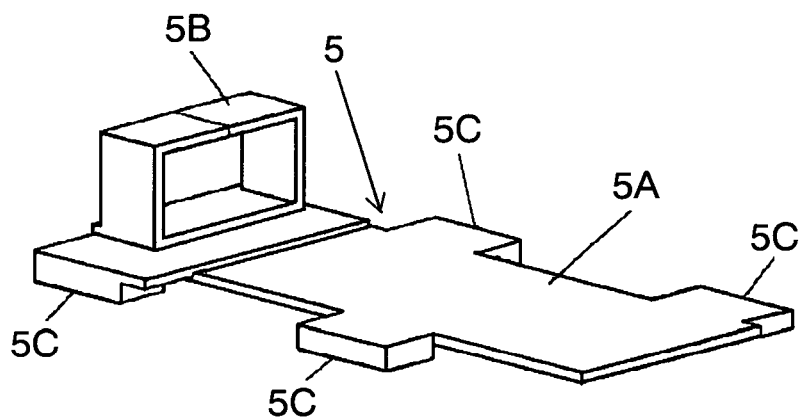
FIG. 4B is a perspective view of an anode lead frame in the structure of FIG. 3A.
Figure 4C:
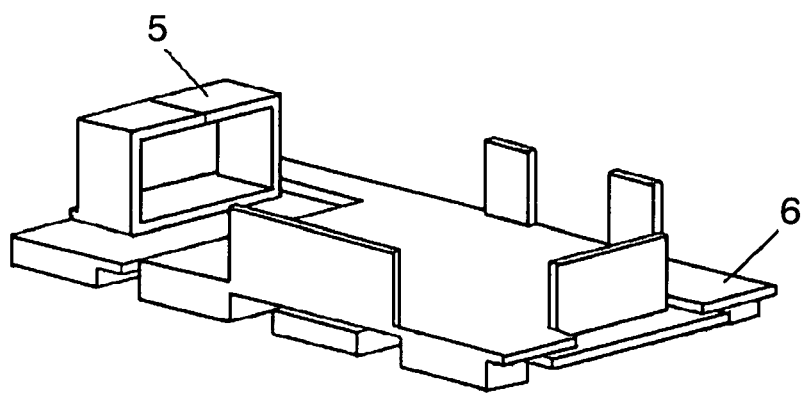
FIG. 4C is a perspective view of the lead frames shown in FIGS. 4A and 4B combined together.

FIGS. 3A and 3B are a perspective view and a bottom view, respectively, of a chip solid electrolytic capacitor of a second exemplary embodiment of the present invention. In FIG. 3A, packaging resin 4 is not illustrated. FIGS. 4A and 4B are perspective views of a cathode lead frame and an anode lead frame, respectively, used in the chip solid electrolytic capacitor; and FIG. 4C is a perspective view of these lead frames combined together. The chip solid electrolytic capacitor of the present embodiment is identical to that of the first exemplary embodiment except for some differences in the structure of the anode terminals of the anode lead frame and the cathode terminals of the cathode lead frame.

Anode lead frame 5 has anode junction 5B and anode terminals 5C for surface mounting on the opposite sides of plane 5A, which is a first plane. Anode junction 5B is formed on one end of plane 5A and is connected to anode portions 1A of capacitor elements 1. Similar to the first exemplary embodiment, anode terminals 5C are provided on the bottom surface of anode lead frame 5. Anode terminals 5C of the present embodiment are formed together with plane 5A by etching the area of the frame substrate other than anode terminals 5C. In other words, anode terminals 5C are thick-walled parts projected from plane 5A towards the side of bottom surface 4A, which is a surface to be mounted. Thus, anode terminals 5C are projected from plane 5A towards the side of the surface to be mounted.

Cathode lead frame 6 has plane 6A, which is a second plane, cathode terminals 6B for surface mounting, and guide walls 6C. Plane 6A and guide walls 6C are substantially the same as plane 3A and guide walls 3C, respectively, described in the first exemplary embodiment. More specifically, plane 6A mounts cathode portions 1B of capacitor elements 1 thereon, and is connected to cathode portions 1B. Plane 6A is then stacked on plane 5A of anode lead frame 5 via an unillustrated insulating layer disposed between these planes. Guide walls 6C are provided on the top surface side of plane 6A so as to position and fix cathode portions 1B of capacitor elements 1. Cathode terminals 6B are formed together with plane 6A by etching the area of the frame substrate other than cathode terminals 6B. In other words, cathode terminals 6B are thick-walled parts projected from plane 6A towards the side of bottom surface 4A, which is the surface to be mounted.

The chip solid electrolytic capacitor of the present embodiment thus structured has an ESL value as low as 248 pH. Thus, the chip solid electrolytic capacitor of the present embodiment has a greatly reduced ESL level in the same manner as in the first exemplary embodiment. Furthermore, since being formed by etching the frame substrate, anode terminals 5C and cathode terminals 6B have better dimensional precision and are simpler in assembly than in the first exemplary embodiment.

In the present embodiment, anode terminals 5C and cathode terminals 6B are formed by etching the respective frame substrates and being projected from planes 5A and 6A, respectively, towards the side of the surface to be mounted. However, the present invention is not limited to this structure. Terminals 5C and 6B, which are thick-walled parts, may be formed by press working instead of etching. Although both of anode terminals 5C and cathode terminals 6B are formed as thick-walled parts in the present embodiment, one may be formed as thick-walled parts and the other may be formed as bent parts as in the first exemplary embodiment.

Figure 5:
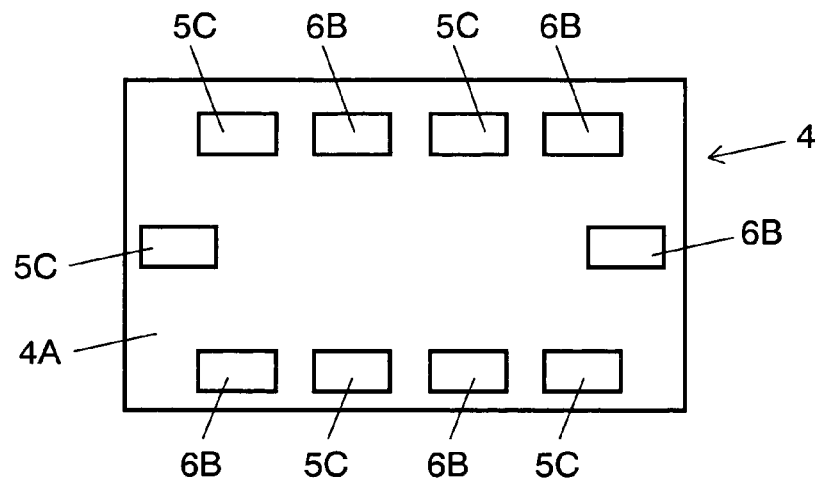
FIG. 5 is a bottom view of another chip solid electrolytic capacitor according to the second exemplary embodiment of the present invention.

The more anode and cathode terminals 5C and 6B that are provided, the better. FIG. 5 is a bottom view of another chip solid electrolytic capacitor of the present embodiment. In the chip solid electrolytic capacitor thus structured, anode terminals 5C and cathode terminals 6B are disposed as close to each other as possible. Thus increasing the number of the terminals shortens the distance of the current flow, thereby reducing the ESL. However, the distance between each of anode terminals 5C and each of cathode terminals 6B must not be less than 0.06 mm.

Note that increasing the number of the anode and cathode terminals and disposing them as close to each other as possible may be applied to the structure of the first exemplary embodiment.

THIRD EXEMPLARY EMBODIMENT

Figure 6A:
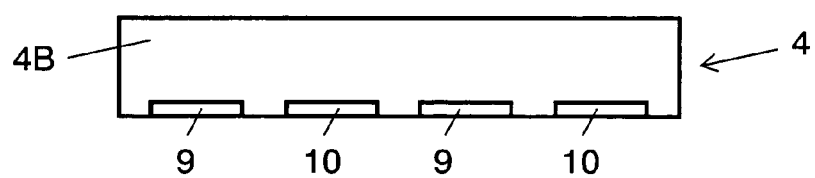
FIG. 6A is a side view of a chip solid electrolytic capacitor according to a third exemplary embodiment of the present invention.
Figure 6B:
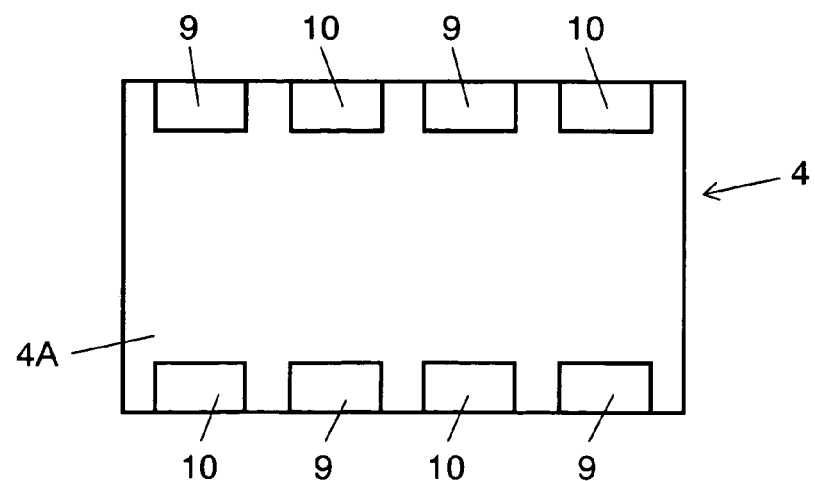
FIG. 6B is a bottom view of the chip solid electrolytic capacitor shown in FIG. 6A.

FIGS. 6A and 6B are a side view and a bottom view, respectively, of a chip solid electrolytic capacitor according to a third exemplary embodiment of the present invention. Anode terminals 9 formed on an unillustrated anode lead frame and cathode terminals 10 formed on an unillustrated cathode lead frame are exposed in such a manner as to be flush with side surface 4B and bottom surface 4A of packaging resin 4. Bottom surface 4A is a surface to be mounted. In other words, at least part of each anode terminal 9 and/or each cathode terminal 10 is in the same plane with side surface 4B.

The chip solid electrolytic capacitor of the present embodiment is identical to either of that of the first and second exemplary embodiment except that the anode terminals and the cathode terminals are exposed on both bottom surface 4A and side surface 4B of packaging resin 4. In the case where the chip solid electrolytic capacitor is mounted on an unillustrated circuit board, it is easy to check solder fillets.

Figure 7:
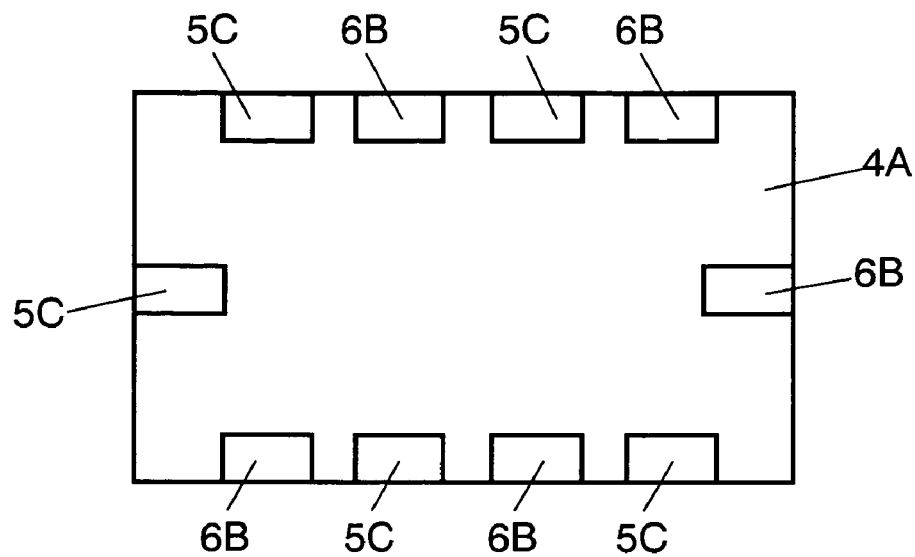
FIG. 7 is a bottom view of another chip solid electrolytic capacitor according to the third exemplary embodiment of the present invention.

As shown in the bottom view of FIG. 7, the structure with a larger number of terminals as described with reference to FIG. 5 in the second exemplary embodiment can provide the same effects.

FOURTH EXEMPLARY EMBODIMENT

Figure 8:
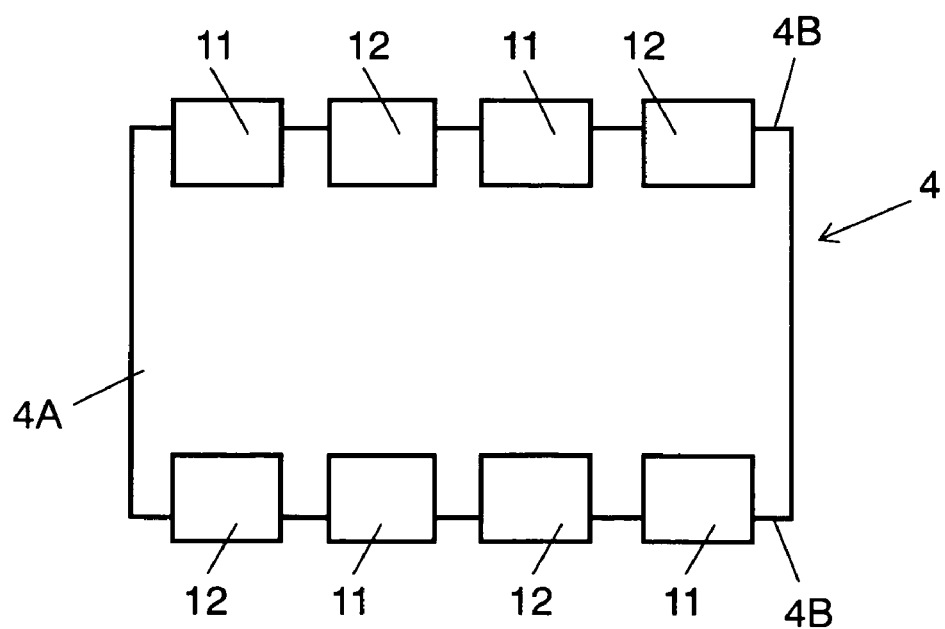
FIG. 8 is a bottom view of a chip solid electrolytic capacitor according to a fourth exemplary embodiment of the present invention.

FIG. 8 is a bottom view of a chip solid electrolytic capacitor of a fourth exemplary embodiment of the present invention. In the present embodiment, at least part of each anode terminal 11 formed on an unillustrated anode lead frame and/or each cathode terminal 12 formed on an unillustrated cathode lead frame is projected outside side surface 4B from bottom surface 4A of packaging resin 4, which is a surface to be mounted. Except for this feature, the chip solid electrolytic capacitor of the present embodiment is identical to that of the third exemplary embodiment.

Similar to the third exemplary embodiment, this structure facilitates the checking of solder fillets from the top view when the chip solid electrolytic capacitor is mounted on an unillustrated circuit board.

Figure 9A:
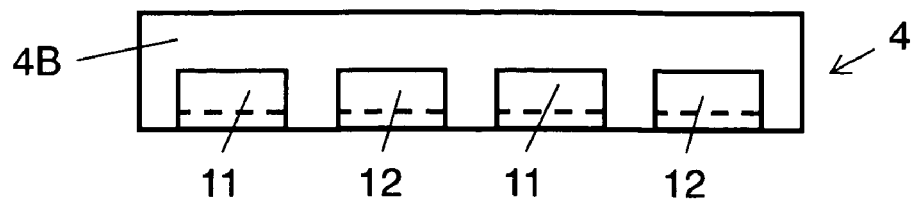
FIG. 9A is a side view of another chip solid electrolytic capacitor according to the fourth exemplary embodiment of the present invention.
Figure 9B:
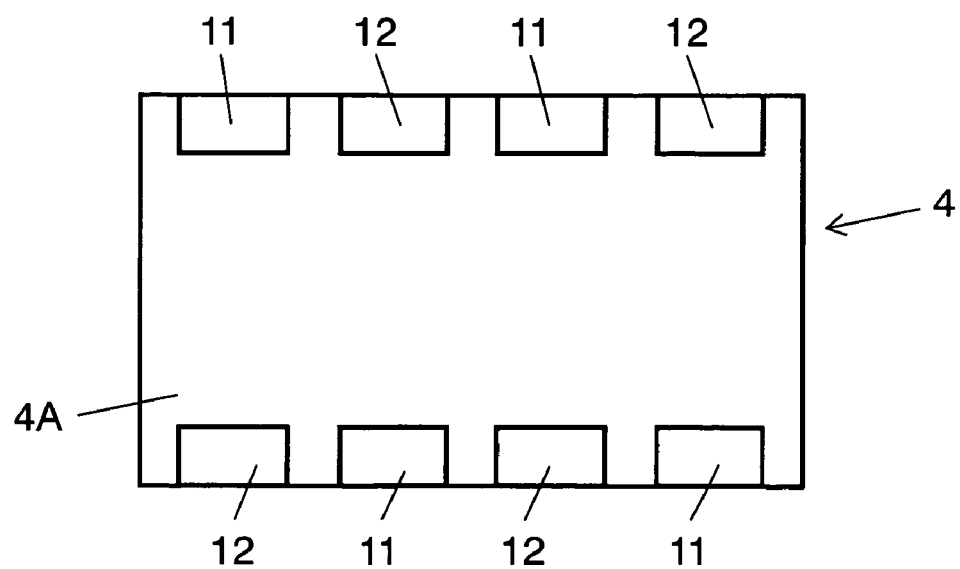
FIG. 9B is a bottom view of the chip solid electrolytic capacitor shown in FIG. 9A.
Figure 10A:
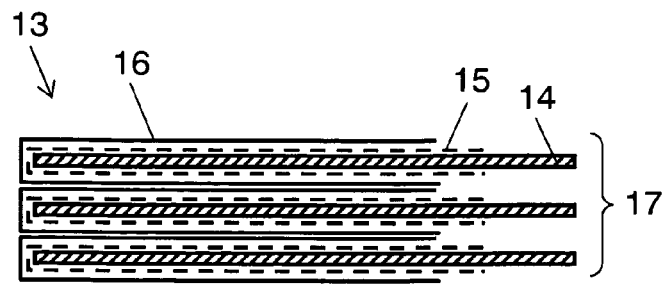
FIG. 10A is a cross sectional view of a laminated body of capacitor elements of a conventional chip solid electrolytic capacitor.
Figure 10B:
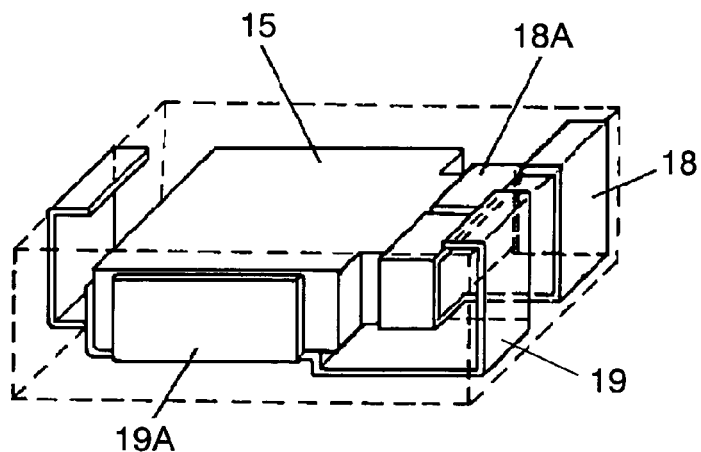
FIG. 10B is a perspective view of an internal structure of the conventional chip solid electrolytic capacitor.
Figure 10C:
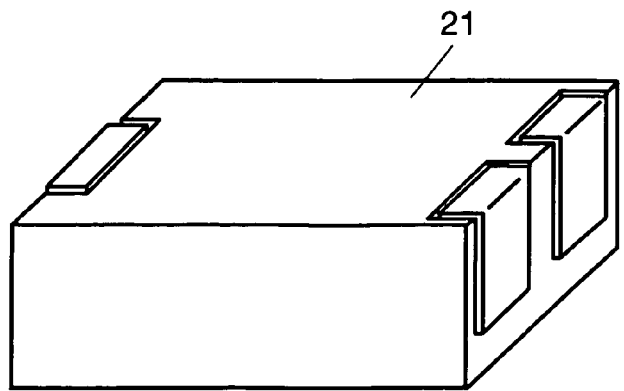
FIG. 10C is a perspective view of an external appearance of the conventional chip solid electrolytic capacitor.

FIGS. 9A and 9B are a side view and a bottom view, respectively, of another chip solid electrolytic capacitor of the present embodiment. In this structure, anode terminals 11 and cathode terminals 12, which are projected from bottom surface 4A of packaging resin 4 towards outside as shown in FIG. 8, are bent upward along side surface 4B of packaging resin 4. This structure facilitates the formation of solder fillets and the checking of them from the top view when the chip solid electrolytic capacitor is mounted on an unillustrated circuit board.

It is preferable that depressions, which are not illustrated, be formed on side surface 4B of packaging resin 4 in order to accommodate parts of anode terminals 11 and cathode terminals 12 bent upward along side surface 4B. The provision of the depressions can downsize the chip solid electrolytic capacitor of the present embodiment.

As described above, in the chip solid electrolytic capacitor of the present invention, the cathode lead frame and the anode lead frame are stacked with each other so as to make currents flowing through them in opposite directions. This structure cancels out the electromagnetic effects of the currents flowing through these lead frames, thereby greatly reducing the ESL. This chip solid electrolytic capacitor is particularly useful to applications where high frequency response is required.

What is claimed is:

1. A chip solid electrolytic capacitor comprising:
   a capacitor element having an anode portion and a cathode portion;
   an anode lead frame having a first plane, an anode junction formed on one end of the first plane and connected to the anode portion, and an anode terminal for surface mounting, the anode terminal being formed on an opposite side relative to the anode junction with respect to the first plane;
   a cathode lead frame having a second plane mounting the cathode portion and connected to the cathode portion and stacked on the first plane in such a manner as to be insulated from the first plane, and a cathode terminal for surface mounting, the cathode terminal being provided on a same side as the anode terminal with respect to the second plane; and
   insulating packaging resin having a surface to be mounted and covering at least the capacitor element in such a manner as to expose the anode terminal and the cathode terminal on the surface to be mounted.

2. The chip solid electrolytic capacitor of claim 1, wherein the anode terminal is one of a plurality of anode terminals.

3. The chip solid electrolytic capacitor of claim 1, wherein the cathode terminal is one of a plurality of cathode terminals.

4. The chip solid electrolytic capacitor of claim 1, wherein the anode terminal is bent to have a U-shaped side face and is projected from the first plane towards a side of the surface to be mounted.

5. The chip solid electrolytic capacitor of claim 1, wherein the cathode terminal is bent to have a U-shaped side face and is projected from the second plane towards a side of the surface to be mounted.

6. The chip solid electrolytic capacitor of claim 1, wherein the cathode lead frame further has a guide wall for positioning the cathode portion, the guide wall being formed along an edge of the second plane and on an opposite side to the cathode terminal with respect to the second plane.

7. The chip solid electrolytic capacitor of claim 6, wherein the guide wall and the cathode portion are fixed to each other.

8. The chip solid electrolytic capacitor of claim 7, wherein the guide wall and the cathode portion are connected to each other with a conductive adhesive.

9. The chip solid electrolytic capacitor of claim 1, wherein the packaging resin has a side surface adjacent to the surface to be mounted; and
   at least one of at least part of the anode terminal and at least part of the cathode terminal is projected outside the side surface from the surface to be mounted.

10. The chip solid electrolytic capacitor of claim 9, wherein
    a part of at least one of the anode terminal and the cathode terminal, which is projected outside the side surface from the surface to be mounted, is bent along the side surface.

11. The chip solid electrolytic capacitor of claim 10, wherein
    the packaging resin is provided with a depression on the side surface, the depression accommodating, the part of the at least one of the anode terminal and the cathode terminal, which is projected outside the side surface from the surface to be mounted and bent along the side surface.

12. A chip solid electrolytic capacitor comprising:
    a capacitor element including an anode portion and a cathode portion;
    an anode lead frame including a first planar portion having a first side and a second side opposite said first side, an anode junction provided at a first end of said first planar portion and on said first side of said first planar portion, and an anode terminal provided on said second side of said first planar portion and being arranged for surface mounting;
    a cathode lead frame including a second planar portion having a first side and a second side opposite said first side, said second planar portion of said cathode lead frame being stacked on said first planar portion of said anode lead frame such that said first side of said second planar portion faces in a same direction as said first side of said first planar portion, such that one of said first and second sides of said first planar portion faces one of said first and second sides of said second planar portion, and such that said first planar portion is insulated from said second planar portion, said cathode lead frame further including a cathode terminal provided on said second side of said second planar portion and being arranged for surface mounting; and
    insulating packaging resin having a mounting surface and covering at least said capacitor element in such a manner that said anode terminal and said cathode terminal are exposed at said mounting surface.

13. The chip solid electrolytic capacitor of claim 12, wherein
    the first planar portion and the second planar portion have substantially a same shape and substantially a same area size.

14. The chip solid electrolytic capacitor of claim 12, wherein
    the anode terminal and the cathode terminal are disposed close to each other, and respectively have mounting surfaces to be surface mounted, said mounting surfaces of said anode and cathode terminals being in a same plane.

15. The chip solid electrolytic capacitor of claim 12, wherein
the anode terminal is a thick-walled part projected from the second side of the first planar portion towards the mounting surface of the insulating packaging resin.

16. The chip solid electrolytic capacitor of claim 12, wherein
the cathode terminal is a thick-walled part projected from the second side of the second planar portion towards the mounting surface of the insulating packing resin.

17. The chip solid electrolytic capacitor of claim 12, wherein
the insulating packaging resin has a side surface adjacent to the mounting surface thereof; and
at least one of at least part of the anode terminal and at least part of the cathode terminal is in a same plane with the side surface.

18. The chip solid electrolytic capacitor of claim 12, wherein the capacitor element comprises:
an anode body made of a valve metal having a roughened surface;
a dielectric oxide film formed on the anode body;
an insulating portion formed on the anode body so as to divide the anode body into the anode portion and the cathode portion;
a solid electrolyte layer formed on the dielectric oxide film and made of conductive polymer; and
a cathode layer formed on the solid electrolyte layer.

19. The chip solid electrolytic capacitor of claim 12, wherein
the anode terminal is one of a plurality of anode terminals.

20. The chip solid electrolytic capacitor of claim 12, wherein
the cathode terminal is one of a plurality of cathode terminals.

* * * * *